United States Patent [19]

Evans

[11] 4,412,003

[45] Oct. 25, 1983

[54] INTEGRAL FLOW CIRCULATOR FOR FLUID BED REACTOR

[75] Inventor: Richard R. Evans, Norwalk, Conn.

[73] Assignee: Dorr-Oliver Inc., Stamford, Conn.

[21] Appl. No.: 288,270

[22] Filed: Jul. 30, 1981

[51] Int. Cl.³ .............................................. C12M 1/00
[52] U.S. Cl. ................................... 435/287; 422/184; 422/227; 210/197; 210/218; 210/275
[58] Field of Search ............... 210/603, 194, 197, 218, 210/219, 274, 275, 293; 422/184, 227; 435/287

[56] References Cited

U.S. PATENT DOCUMENTS

| | | | |
|---|---|---|---|
| 471,811 | 3/1892 | Deutsch | 210/279 |
| 484,781 | 10/1892 | Deutsch | 210/279 X |
| 2,425,372 | 8/1947 | Green | 210/197 X |

Primary Examiner—Ferris H. Lander
Attorney, Agent, or Firm—Harold M. Snyder; Burtsell J. Kearns

[57] ABSTRACT

A fluid bed reactor includes an integral flow circulator which eliminates the need for recirculation equipment external to the reactor and permits utilization of multiple distributor modules to provide a wide range of reactor capacities.

1 Claim, 4 Drawing Figures

INTEGRAL FLOW CIRCULATOR FOR FLUID BED REACTOR

BACKGROUND OF THE INVENTION

This invention is directed to an integral internal circulation system for a fluid bed biological or adsorption reactor.

Fluid bed reactors have been demonstrated as effective supplemental or replacement reactors for adsorptive or biological treatment of waste water for BOD removal, nitrification and denitrification. Fluid bed reactors, as stated, may be biological or adsorptive in character. In biological reactors, the treatment is accomplished primarily by microorganisms which feed on the nutrients in the wastewater. In adsorptive reactors the treatment is primarily physical with the impurities in the wastewater being adsorbed and so entrapped on an appropriate medium such as activated carbon.

The basic apparatus and methods of operation of fluid bed biological reactors are disclosed and covered in a series of patents including U.S. Pat. No. 3,846,289, issued Nov. 5, 1974, U.S. Pat. No. 3,956,129, issued May 11, 1976, U.S. Pat. No. 4,009,099, issued Feb. 22, 1977 and U.S. Pat. No. 4,009,098, issued Feb. 22, 1977.

These patents disclose that, in a fluidized bed environment, where solid particles, such as sand, form a bed which is suspended in an upwardly flowing liquid stream with the particles in continuous motion, an enormous surface area for biological growth is available. When appropriate conditions of temperature, pH, availability of food, absence or presence of oxygen, are maintained, biological growth is remarkably rapid so that the reactor volume required and the retention time necessary to achieve a given biological conversion are drastically reduced. Accordingly, then, substitution of fluid bed biological reactors for the reactors in common use today, gives promise that the land area now devoted to biological treatment plants, can, in the future, be significantly reduced.

In another patent, U.S. Pat. No. 4,202,774, issued May 13, 1980, it is pointed out that while fluidization and suspension of particulate solids are extremely important in promoting biological growth on the solids in fluid bed biological processes, excessive agitation of the solids is to be avoided to reduce abrasion of the solids with resultant removal of the biological growth. In order to avoid the deleterious effects of excessive agitation of the fluidized particulate solids, the patent discloses novel liquid flow distributors capable of introducing influent into the fluid bed reactor and directing large flow volumes vertically upward in the reactor without causing excessive turbulence therein.

In fluid bed waste water reactors of the type described above, a certain loading rate (mass loading) on the reactor is required to allow the desired biological reactions to occur, and this sets a limit on the volume of untreated waste water which can be introduced into a reactor of given size in a specified period of time. However, for this same reactor, there is a minimum flow of liquid into the reactor which must be observed to maintain the necessary degree of fluidization of the particulate solids. In order to satisfy both conditions, recirculation of the liquid from above the fluidized bed to the reactor liquid flow distributor is undertaken; the necessary flow rate for fluidization is thus achieved, while the influent can be limited to that flow which can be adequately treated in the reactor.

The recirculation circuit which has been used is a system external to the reactor and includes a pump, a conduit connecting the region of the reactor above the fluidized zone of the reactor with the pump for withdrawing liquid from that region and a conduit connecting the pump to a region below the fluidized zone of the reactor for reinjection of the liquid to maintain fluidization. The piping for such installations, with pipes often having a diameter of 24 inches or more, is expensive; the cost of external recirculation piping for a typical reactor representing 15 to 20% of the installed cost.

Accordingly, a very real need exists for an improved recirculation system for fluid bed reactors.

In the main, prior art structures, if at all relevant, are generally directed to sand filters rather than fluid bed reactors. In the process of sand filtration, the liquid to be filtered passes downwardly through a sand bed which removes particulate material from suspension in the liquid. This downflow system does not result in fluidization of the sand particles during normal operation. The following patents show various aspects of the prior art in sand filters:

| U.S. Pat. Nos. | | |
|---|---|---|
| 1,138,634 | J. M. Davidson | May 1915 |
| 1,919,565 | W. C. Laughlin | July 1933 |
| 2,199,891 | M. J. Martin | May 1940 |
| 3,512,649 | R. Nebolsine et al | May 1970 |
| 3,625,365 | J. E. Armstrong | December 1971 |

The following U.S. patent is directed to a reaction vessel for a catalytic gas-liquid reaction in which recycle of liquid, which separates from vapor in an upper chamber of the reactor, is provided:

| U.S. Pat. No. 3,414,386 | E. D. Mattix | December 1968 |
|---|---|---|

SUMMARY OF THE INVENTION

In accordance with this invention, the recirculation system for the fluid bed reactor is almost completely within the reactor tank; no external piping is required for recirculation.

More particularly, a reactor tank is provided with a circulator therein comprising a column conduit extending from the bottom to the top of said reactor tank and having a pump therein for directing a downward flow of liquid through said column conduit, one or more fixed, perforated, horizontal collection manifolds in flow connection with said column conduit and positioned at a level in said reactor tank below the surface of the liquid in said tank but above the level of fluidized particulate solids therein, one or more fixed, horizontal, distributor headers adjacent the bottom of said reactor tank in flow communication with said column conduit, distributor pipes connected to said distributor headers to provide generally uniform discharge of liquid over the cross-section of the reactor tank and an influent pipe in flow connection with said column conduit.

The reaction tank is provided with a cover when anaerobic processes are contemplated to trap gases, particularly methane, produced in such processes. In such an anaerobic reaction tank, it is preferred to provide an enclosed pump well surrounding the conduit column in the upper portion thereof, so that only the gas in the pump well is discharged into the atmosphere when pump maintenance is required. A gas conduit is provided to draw off the gas from the gas space under the reactor cover outside the pump well.

The reactor tanks of the invention lend themselves to modular development when reactor tanks of rectangular cross-section are employed. In such cases, a flow distributor module can be constructed in a rectangular configuration with each distributor header having a plurality of distribution pipes of uniform length fixed in perpendicular relationship to each distributor header in a horizontal plane. A plurality of flow distributor modules can be employed in a rectangular reactor tank served by a single column conduit.

These and other features and advantages of the invention will become more clear from the following description of the preferred embodiment and the drawings.

DETAILED DESCRIPTION

While the structures of the invention may be used to carry out processes of either the biological or adsorptive type, the description below refers primarily to reactors intended to carry out biological reactions.

Figure 1:
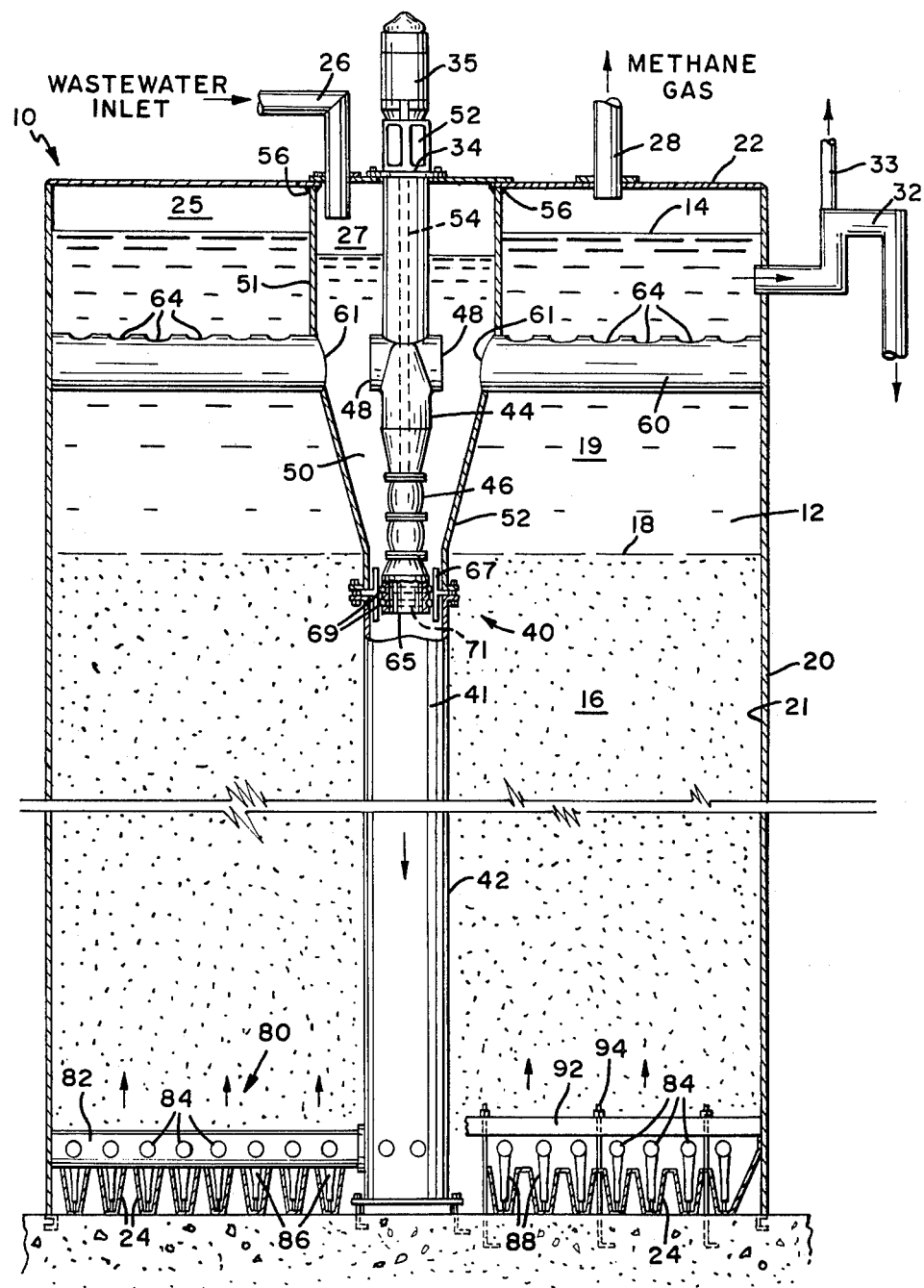
FIG. 1 is a view in elevation of a fluid bed biological reactor with an integral internal circulator, much of the structure shown in section and portions thereof broken away to show structural details.

In FIG. 1, one embodiment of the fluid bed biological reactor 10 with integral internal circulator 40 is shown which includes the reactor tank 20 having sidewall 21, airtight cover 22 and tank bottom 24. The reactor tank 20 may have either a circular or rectangular cross-section. Within the reactor tank 20, the circulator structure 40 is provided having, at its main components, a column conduit 42 which extends from the tank cover 22 to the tank bottom 24, inlet manifolds 60 in flow connection with the upper end of said column conduit 42, and a flow distributor 80 in flow connection with the lower end of column conduit 42. In the covered reactor tank 29 there is a body of wastewater 12 undergoing biological reaction having an upper surface 14 above which there is a gas space 25 which extends between the upper surface 14 and the cover 22. Within the body of wastewater 12 there is a zone of fluidized particulate solids which extends upward from the flow distributor 80 to the level 18, the precise position of which level varies with the upward velocity of the incoming fluid, the density of the particulate solids having biological growth thereon and the frequency of biological growth removal. Above level 18 in the reactor tank 20 there is a freeboard zone 19 which is essentially devoid of particulate solids. A wastewater inlet 26 is provided into reactor tank 20, a methane gas outlet pipe 28 opens into gas space 25 while an effluent off-take 32 having a vent 33 is in flow connection with zone 19 within reactor tank 20.

The column conduit 42 consists of a lower section 41, which is essentially a straight vertical conduit connected at its lower extremity to the flow distributor 80, and an upper section 44 in which there is a pumping element 46. Drive shaft 54 passes axially through conduit section 44 to connect pump 46 to the pump motor 50. Pump motor 50 is mounted on motor support 52 which, in turn, is mounted on access cover 34. The access cover 34 is bolted to tank cover 22 of reactor tank 20. The upper section 44 of column conduit 42 is in flow communication with the collection manifold 60.

Surrounding the upper section 44 of column conduit 42 is a pump well 50 having an upper cylindrical wall section 51 which is sealingly joined to the tank cover member 22 by weldments 56. A transition wall member 52 of generally conical configuration joins the cylindrical upper portion 51 to the lower column conduit section 41. The upper section 44 of column conduit 42 is open to the pump well 50 through ports 48. The pump outlet 65 which is situated at the lower end of the upper section 44 of column conduit 42 is slidably seated in a cylindrical centering sleeve 67 which is centrally fixed relative to the lower section 41 of column conduit 42. The slidable contact is afforded by o-rings 69, fixed in grooves 71 provided on the outer surface of pump outlet 65, which engage centering sleeve 67.

Collection manifolds 60 extend across reactor tank 20 in freeboard region 19 from points adjacent the reactor tank wall 21 to join with pump well 50 at ports 61 in the wall member 51 or 52 of the pump well 50.

The collection manifolds 60 have a plurality of collection ports 64 along the upper surface of the manifolds. Manifolds 60 are located in the freeboard region 19 within the reactor tank 20.

Adjacent the bottom of the reactor tank 20 is the flow distributor 80 in which a plurality of distributor headers 82 are connected to the column conduit 42. Each of the distributor headers 82 has an array of distributor pipes connected thereto. The distributor pipes 84 have a plurality of ports (not shown) along the bottom thereof in flow connection with the flow skirts 86 which provide a channel toward the narrow bottom end of the troughs 88 formed by the crenolated bottom 24 of the reactor tank 20. Hold down bars 92 which are anchored by pins 94 to the concrete foundation underlying the reactor tank 20 may be provided to prevent the tendency of the arrays of distributor pipes 84 to rise in the reactor tank.

In operation wastewater is admitted through waste water inlet 26 into the pump well 50 and flows to the ports 48 of the upper section 44 of column conduit 42. In addition, recirculating wastewater flowing through collection ports 64 of the collection manifolds 60 enters the pump well 50 through ports 61 and joins the wastewater admitted through inlet 26 in flowing through ports 48. The wastewater admitted into section 44 of column conduit 42 flows vertically downward in conduit 44 under the influence of pump 46 which forces the wastewater vertically downward through pump outlet 65 into the lower section 41 of column conduit 42. The wastewater passes from column conduit 42 to distribution headers 82 to flow distributor 80 and from the headers 82 to the distributor pipes 84. From the distributor pipes 84 the flow passes downwardly into flow skirts 86 and emerges and turns upwardly in troughs 88 to fluidize the particulate solids in the fluidized bed 16. The liquid flow continues upwardly into the relatively clear freeboard zone 19 and then passes the collection manifolds 60 with a large portion of the liquid flow passing into collection ports 64, while the remainder passes into the vented outlet pipe 32 through which it is routed for further treatment or disposal. The gases produced in the reaction occurring in the reaction tank 20 collect in the gas space 25 above the liquid level 14 and pass finally through gas outlet 28. Since a large proportion of the gas produced is methane, the gas may be burned for heating purposes or for power generation.

It will be appreciated that the upper section 44 of the column conduit 42, with the pump 46 therein, is readily removable from the reactor tank 20 for repair or replacement. All that is required for removing section 44 is purging of the gas space 27 and unbolting the cover element 34 and sliding section 44 out of the pump well 50. It should be noted that the only gas which escapes during this operation is that in the gas space 27 in the pump well 50 and that the gas in gas space 25 is in an entirely sealed region.

Figure 2:
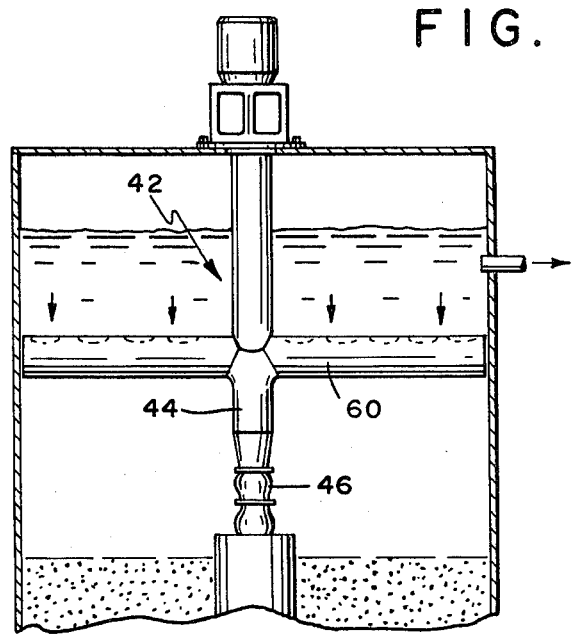
FIG. 2 is an elevational view of an alternate embodiment of the upper portion of the circulator structure.

The alternate embodiment shown in FIG. 2 is directed to a structure in which escaping gas is not a serious problem and, therefore, a pump well is not required. In this embodiment, the collection manifolds 60 are joined directly to the upper section 44 of the column conduit 42.

It will be appreciated that when the reactor tank 20 has a cylindrical configuration and, hence, a circular cross section, the distributor pipes 84 associated with each distribution header 82 are all of different lengths. Thus, a distribution pipe near column conduit 42 may have a length approaching the diameter of the cylindrical tank, but each pipe further away from the column conduit 42 will be slightly shorter in length than its neighbor, since the pipes are arranged on chords of the circular cross-section of the cylindrical tank and the chords diminish in length as distance from the center of the circle increases. The distribution pipe at the outer extremity of the distribution header 82 will be the shortest distribution pipe.

Figure 4:
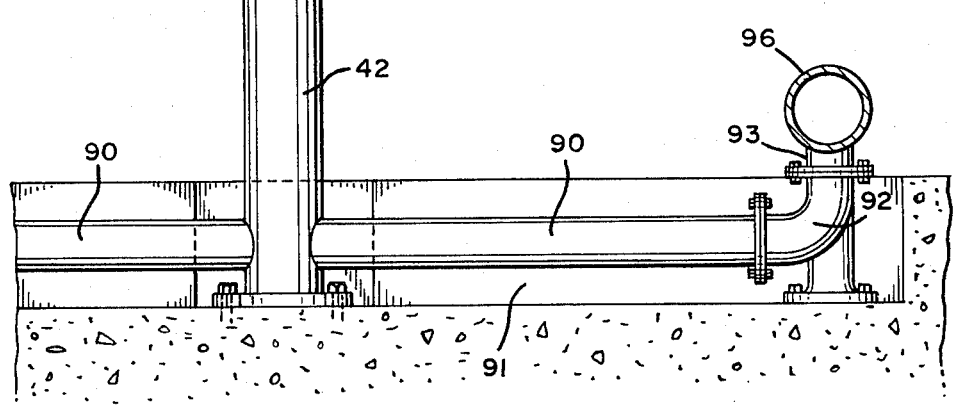
FIG. 3 is a partial isometric view of two distributor modules of the invention in a fluid bed biological reactor of reactangular cross-section and FIG. 4 is an elevational view of the distributor header arrangement for use with multiple distributor modules.
Figure 3:
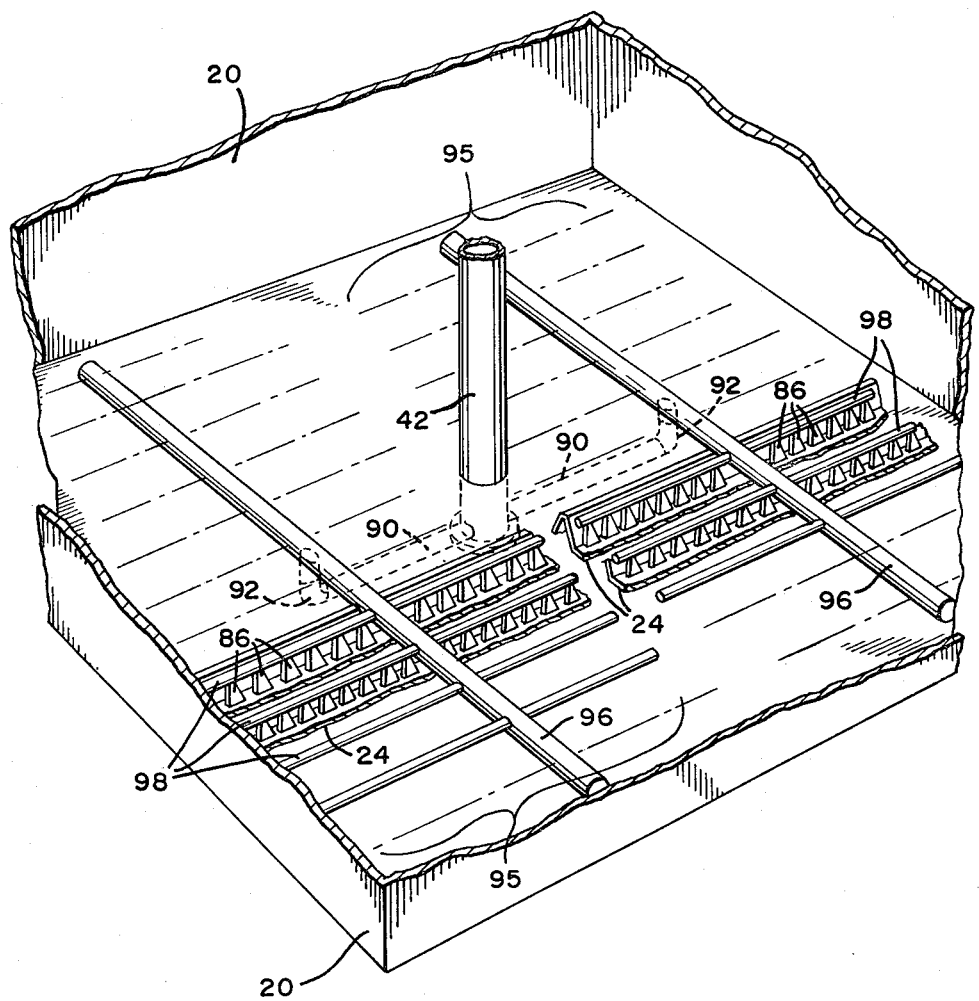

A rectangular array of distribution pipes is an arrangement in which all of the distribution pipes may be of equal lengths. Such rectangular arrays of distribution pipe permit modular development, with a plurality of such rectangular arrays used for achieving economy of scale. In FIGS. 3 and 4 such a modular development is shown in which a rectangular reactor tank 20 is provided. Within the tank 20 is positioned a column conduit 42 of structure exactly similar to that described above, but extending slightly below tank bottom 24. Also in tank 20 are a pair of flow distributors 95 of rectangular configuration. Each of the flow distributors 95 includes a distributor header 96 and a plurality of pipe distributors 98 of uniform length arranged along the length of the distributor header 96 and perpendicular thereto to give the rectangular configuration of the flow distributors 95. A pair of feeder conduits 90 are provided in trenches beneath the tank bottom 24 and are connected at one end to column conduit 42. At the outer end of each feeder conduit 90 is a 90° elbow 92 oriented to open vertically upward. The elbow 92 joins a tee 93 in the distributor header 96.

While a top feed for the incoming wastewater has been illustrated, it will be understood that the wastewater inlet pipe could be arranged to pass through the side of tank 20 for connection with the lower section 41 of column conduit 42.

There has thus been disclosed a novel internal circulation system for a fluid bed reactor which eliminates expensive external piping and lends itself to modular development.

It is expressly understood that the present invention is not limited to the embodiment illustrated and described. Various changes can be made in the design and arrangement of parts without departing from the spirit and scope of the invention as the same will now be understood by those skilled in art.

I claim:

1. A fluid bed reactor for containing a volume of waste water undergoing treatment together with inert particulate material, comprising a reactor tank adapted for anaerobic biological processes which generate combustible gases in that it is provided with an air-tight cover, a gas space over the liquid in said reactor tank, a flow circulator in said reactor tank, including a column conduit extending from the bottom to the top of said reactor tank, a pump in said column conduit arranged to discharge vertically downward, a pump motor operatively connected to said pump and mounted on said cover, a pump well wall surrounding the upper end of said column conduit and the pump therein and having sealing contact with said cover, said pump well wall extending through said gas space into the liquid within said reactor tank, thereby providing a gas zone of limited volume within said pump well so that only said limited volume of gas is discharged into the atmosphere when said pump-containing section of said column conduit is withdrawn from said tank, a plurality of fixed, perforated, horizontal collection manifolds in flow connection with and positioned proximate the upper end of said column conduit but below the surface of the liquid in said reactor tank, a plurality of fixed, horizontal distributor headers adjacent the bottom of said reactor tank in flow connection with the column conduit, distributor pipes connected to said distributor header for injecting fluidizing liquid essentially uniformly across the cross-section of said reactor tank and adjacent the bottom thereof and an influent pipe in flow connection with said column conduit having connection with an external source of waste water.

* * * * *